(12) United States Patent
Blasdel et al.

(10) Patent No.: US 9,511,492 B2
(45) Date of Patent: Dec. 6, 2016

(54) PUSH CONSTRAINT USING ROBOTIC LIMBS

(71) Applicant: Toyota Motor Engineering & Manufacturing North America, Inc., Erlanger, KY (US)

(72) Inventors: Aaron M. Blasdel, San Jose, CA (US); Joseph M. A. Djugash, San Jose, CA (US)

(73) Assignee: Toyota Motor Engineering & Manafacturing North America, Inc., Erlanger, KY (US)

( * ) Notice: Subject to any disclaimer, the term of this patent is extended or adjusted under 35 U.S.C. 154(b) by 115 days.

(21) Appl. No.: 14/636,909

(22) Filed: Mar. 3, 2015

(65) Prior Publication Data

US 2016/0257001 A1  Sep. 8, 2016

(51) Int. Cl.
*B25J 9/16* (2006.01)

(52) U.S. Cl.
CPC .............. *B25J 9/1664* (2013.01); *B25J 9/1682* (2013.01); *B25J 9/1694* (2013.01); *B25J 9/1697* (2013.01); *Y10S 901/02* (2013.01); *Y10S 901/10* (2013.01)

(58) Field of Classification Search
CPC ....... B65G 47/22; B65G 47/24; B65G 47/766; B65G 47/80; B65G 47/82; B25J 9/1664; B25J 9/1656; B25J 9/1682; B25J 9/1694; B25J 9/1697; B25J 13/081; B25J 13/084; B25J 13/086; G05B 19/401
See application file for complete search history.

(56) References Cited

U.S. PATENT DOCUMENTS

| | | | |
|---|---|---|---|
| 4,398,863 A | 8/1983 | Shum | |
| 4,700,308 A | 10/1987 | Jones | |
| 4,744,039 A * | 5/1988 | Suzuki | B25J 9/1692 700/193 |
| 8,818,555 B2 | 8/2014 | Kim | |

* cited by examiner

*Primary Examiner* — Nicholas Kiswanto
*Assistant Examiner* — Adam Mott
(74) *Attorney, Agent, or Firm* — Dinsmore & Shohl LLP

(57) ABSTRACT

Methods and systems of determining a location of a target object on a surface are disclosed. A method may include positioning a robotic arm proximate to the target object, moving the robotic arm at a trajectory such that the robotic arm contacts the target object and pushes the target object across the surface into a target area bound by known dimensional coordinates, moving a robotic hand coupled to the robotic arm along a vector that corresponds to one of the known dimensional coordinates such that the robotic hand contacts the target object in the target area, and grasping the target object with the robotic hand.

20 Claims, 14 Drawing Sheets

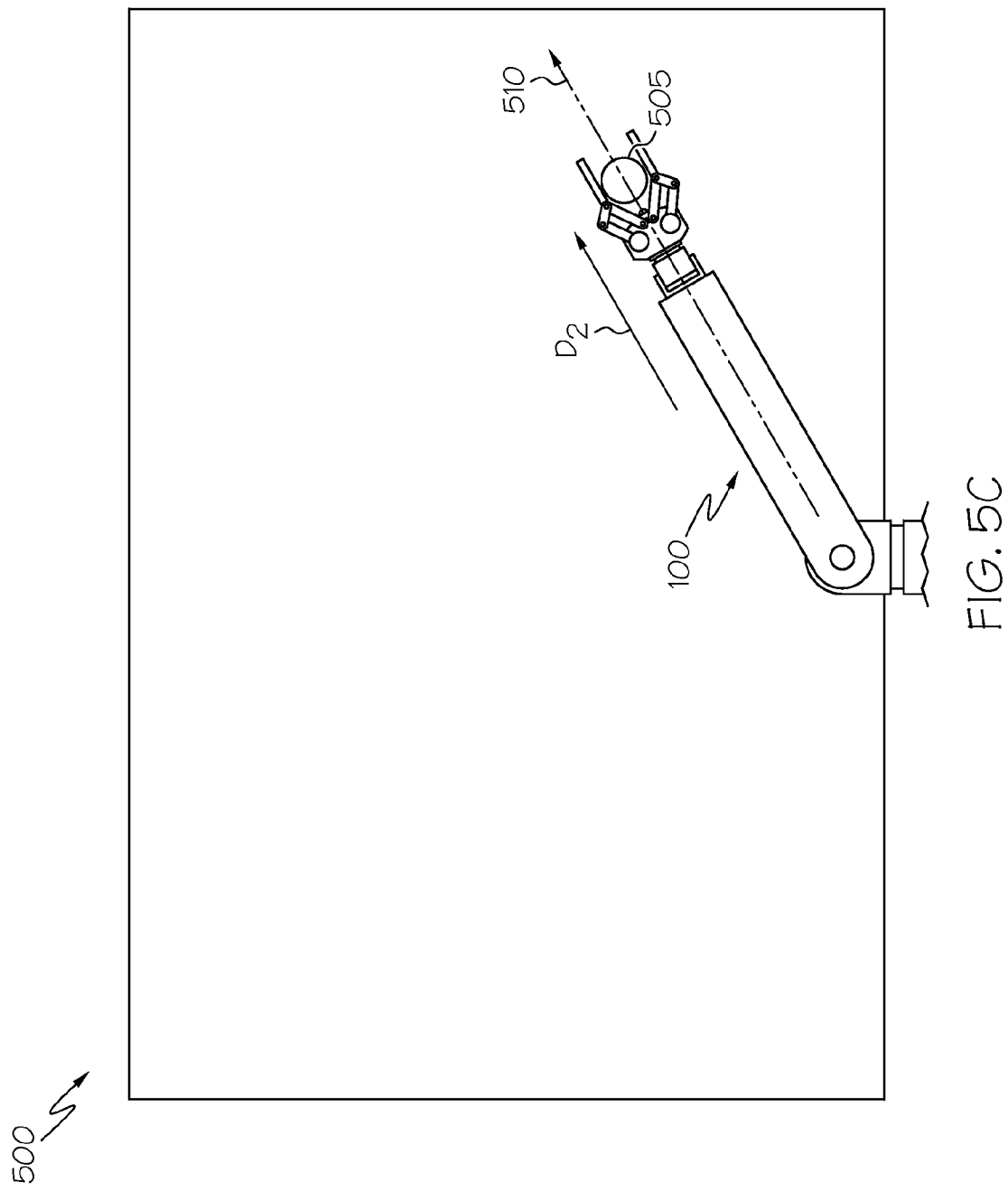

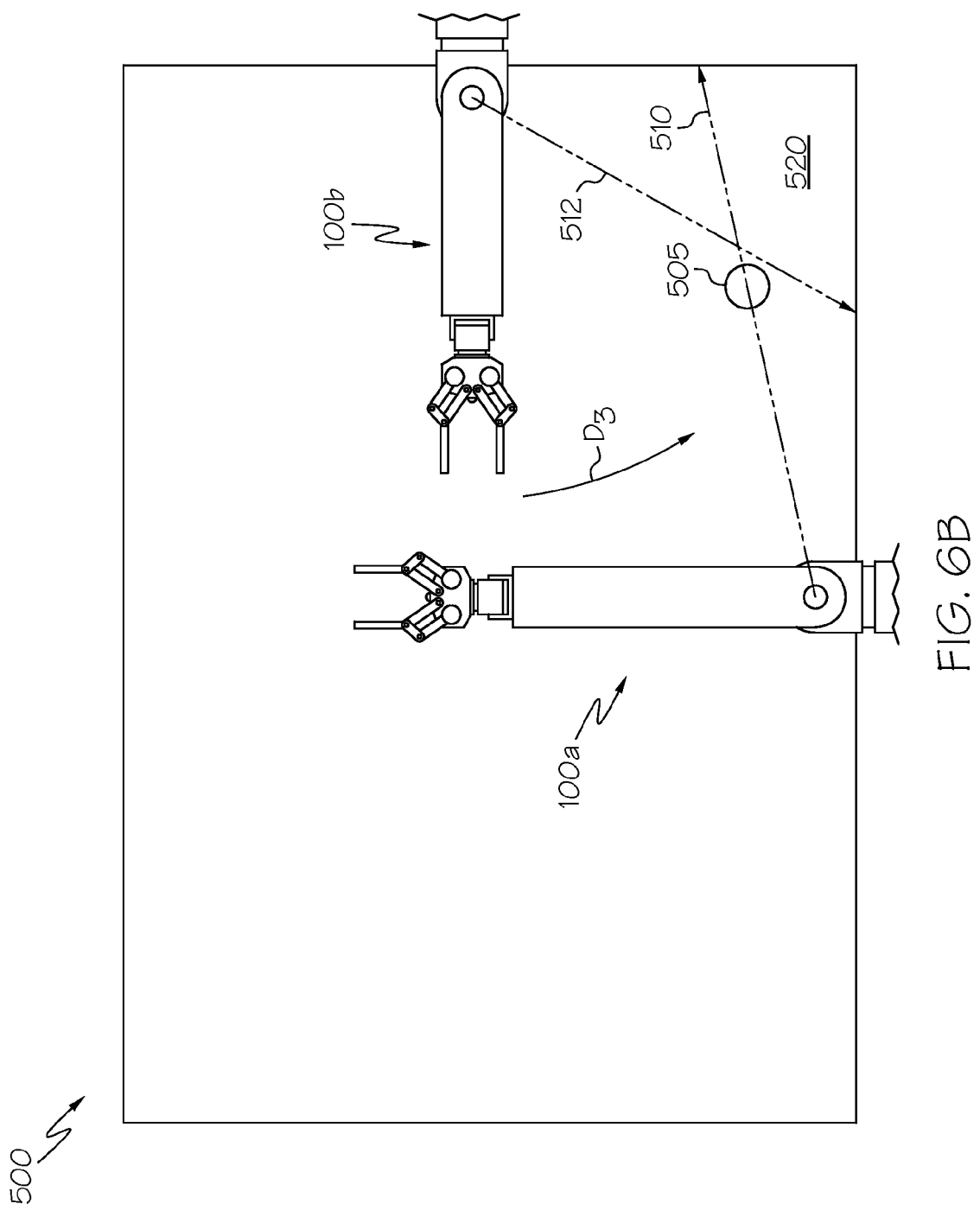

PUSH CONSTRAINT USING ROBOTIC LIMBS

TECHNICAL FIELD

The present specification generally relates to robotics systems and, more specifically, robotics systems configured to locate and manipulate objects.

BACKGROUND

As robotics systems become increasingly sophisticated, they are used to automate a number of tasks. For example, robotics systems are frequently used to complete assembly line tasks that require repetitive motions. Certain robotics systems that are used include grasping systems, which are used to hold, pick up, and/or move objects. Such grasping systems are required to locate an object, move to the object location, and grasp the object in a proper manner that avoids object damage, accidental dropping, and/or the like. Previous attempts to ensure proper grasping have included the use of various sensors, which sense target object location, orientation, and/or the like, as well as appropriate robotic arm and hand/claw orientation with respect to the target object to ensure a proper grasp. Such sensing systems are costly, prone to error, prone to damage, and not widely used. Moreover, robotic grasping systems that rely on such sensing systems are unable to function when the sensing system is down due to damage or non-ideal operating conditions, which increases production costs in an assembly line setting. Other solutions have included vibration systems that cause a work surface to vibrate such that an object moves to a particular location. However, such systems are inaccurate and cannot position an object sufficiently to ensure a proper grasp.

Accordingly, a need exists for alternative robotic grasping systems that can be used without sensing systems.

SUMMARY

In one embodiment, a method of determining a location of a target object on a surface includes positioning a robotic arm proximate to the target object, moving the robotic arm at a trajectory such that the robotic arm contacts the target object and pushes the target object across the surface into a target area bound by known dimensional coordinates, moving a robotic hand coupled to the robotic arm along a vector that corresponds to one of the known dimensional coordinates such that the robotic hand contacts the target object in the target area, and grasping the target object with the robotic hand.

In another embodiment, a system of determining a location of a target object on a surface includes a robotic arm coupled to a robotic hand, a processing device in communication with the robotic arm, and a non-transitory, computer-readable storage medium in communication with the processing device. The non-transitory, computer readable storage medium includes programming instructions that, when executed, cause the processing device to direct the robotic arm to move from a first location that is proximate to the target object such that the robotic arm contacts the target object and pushes the target object across the surface into a target area in a second location, direct the robotic hand to move along a vector that corresponds to one of the known dimensional coordinates such that the robotic hand contacts the target object in the target area, and direct the robotic hand to grasp the target object. The target area may be bound by known dimensional coordinates.

In yet another embodiment, a method of determining a location of a target object on a surface includes directing, by a processing device, a robotic arm to move from a first location that is proximate to the target object such that the robotic arm pushes the target object across the surface into a target area in a second location, directing, by the processing device, a robotic hand coupled to the robotic arm to move along a vector that corresponds to one of the known dimensional coordinates such that the robotic hand contacts the target object in the target area, and directing, by the processing device, the robotic hand to grasp the target object. The target area may be bound by known dimensional coordinates.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 5A-5C depict a diagrammatic top view of an illustrative single robotic arm movement on a surface according to one or more embodiments shown and described herein;

FIGS. 6A-6C depict a diagrammatic top view of an illustrative plurality of robotic arm movements on a surface according to one or more embodiments shown and described herein;

DETAILED DESCRIPTION

The present application generally relates to use of a robotic arm on a surface to move a target object to a known area for purposes of grasping the target object with a robotic hand without use of one or more sensors to determine the location of the target object. Thus, a specific location of the target object is unknown prior to the movement. Once the target object has been moved into the known area, the robotic hand is configured to grasp the target object within the known area. In some embodiments, sensors may be used to detect when the robotic arm has contacted the target object. However, such sensors are used solely for detecting contact and not for location of the target object.

Figure 1:
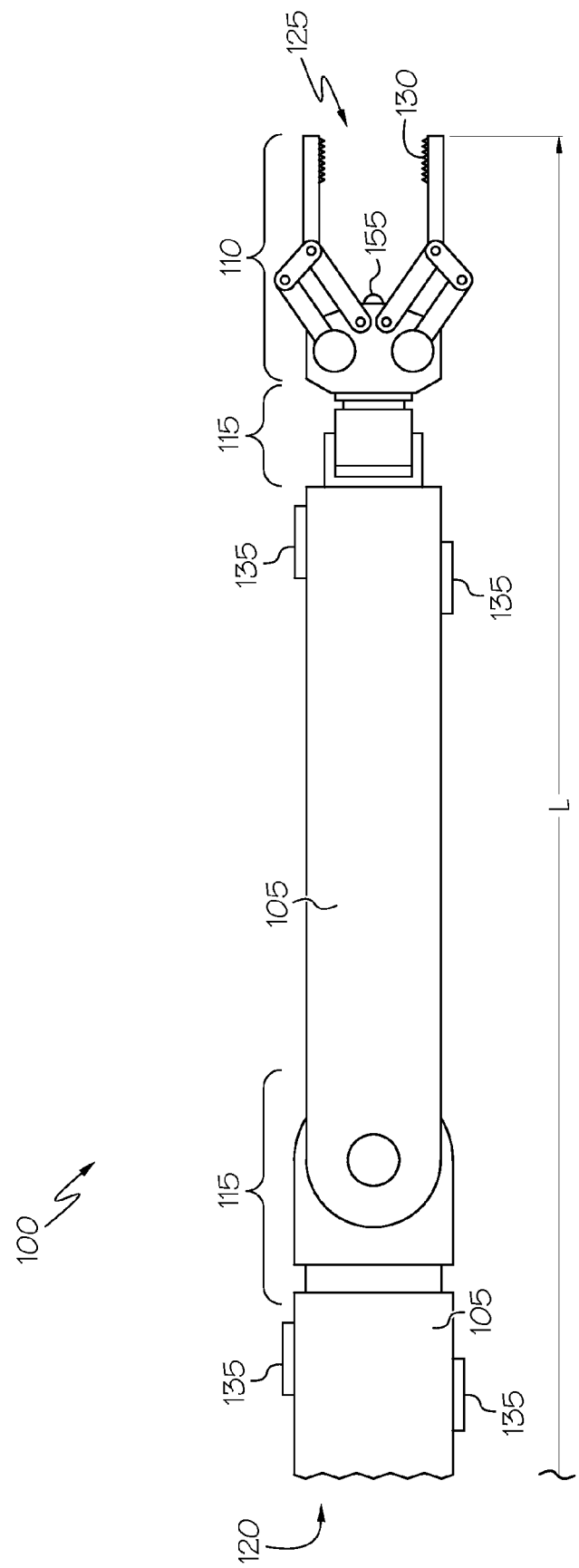
FIG. 1 depicts a schematic side view of an illustrative robotic arm and hand according to one or more embodiments shown and described herein.

FIG. 1 depicts an illustrative robotic arm, generally designated 100, according to various embodiments. The robotic arm is not limited by this disclosure, and may generally be any robotic arm now known or later developed. Accordingly, the robotic arm 100 may have one or more components, features, and the like. Certain components and features will be described in greater detail herein.

In various embodiments, the robotic arm 100 may have a length L, a proximal end 120 and a distal end 125. In some embodiments, the robotic arm 100 may be configured such that the proximal end 120 is fixedly attached to an object (such as a movable or stationary object) while the distal end 125 is configured to move relative to the proximal end. The proximal end 120 may be connected to a mount via a joint or the like (not shown). In some embodiments, the proximal end 120 may be connected to a movable mount. In other embodiments the proximal end 120 may be connected to a stationary mount. One or more arm body segments 105 may extend from the proximal end 120 to the distal end 125 and may be connected by one or more joints 115.

The robotic arm 100 may generally include the one or more arm body segments 105, which are joined by one or more joints 115. For example, in some embodiments, the robotic arm 100 may have seven arm body segments 105 that are joined by six joints 115 (not all segments and joints are depicted in FIG. 1). A computing device (as described in greater detail herein) may control the robotic arm 100 by directing one or more movement devices connected to each joint 115. Such an illustrative robotic arm 100 with seven segments and six joints may resemble a human arm, as it incorporates an equivalent of a shoulder, an elbow, and a wrist. In some embodiments, the portion that resembles a shoulder may be mounted to a stationary base structure rather than to a movable body. Such an illustrative robotic arm 100 may have about six degrees of freedom, thereby allowing the robotic arm to pivot in six different motions.

The robotic arm 100 may include any components now known or later developed, particularly components recognized by those having ordinary skill in the art may recognize as being components used for robotics. For example, the robotic arm 100 may also include one or more devices configured to move the robotic arm, such as a motor, a solenoid, a hydraulic system, a pneumatic system, a piezoelectric system, and/or the like. In some embodiments, the robotic arm 100 may include one or more step motors, which may allow for exact movement of the robotic arm in particular increments, thereby allowing for precise control of the robotic arm. In addition, the robotic arm 100 may include one or more devices for communication between the various components and/or one or more computing devices, as described in greater detail herein. Such communications devices may receive control signals that direct movement of the robotic arm 100 and/or components thereof.

In some embodiments, the distal end 125 of the robotic arm 100 may include a robotic hand 110. The robotic hand 110 may be connected to an arm body segment 105 via a joint 115. The joint 115 may generally be configured to allow the robotic hand 110 to rotate about one or more axes relative to the arm body segment 105. The robotic hand 110 may generally be configured to engage with a target object and/or to complete various grasping tasks, which may be completed, for example, by clamping the robotic hand on a target object, as described in greater detail herein.

In various embodiments, one or more portions of the robotic arm 100 may be configured to extend and contract. Thus, the robotic arm 100 may incorporate one or more features (not shown) that allow for extension and contraction to change the length L of the robotic arm. Illustrative features for extending and contracting one or more portions of the robotic arm 100 may include, but are not limited to, hydraulics systems, pneumatics systems, and/or the like. In some embodiments, extension and contraction of one or more portions of the robotic arm 100 may allow for the robotic hand 110 to engage with a target object, as described in greater detail herein.

In various embodiments, the robotic arm 100 may include one or more sensors 135 attached to a portion of the robotic arm, such as, for example, an arm body segment 105, the robotic hand 110, a joint 115, a base portion, and/or the like. In some embodiments, the one or more sensors 135 may extend the length L of the robotic arm 100. In other embodiments, the one or more sensors 135 may only extend a portion of the length L of the robotic arm 100. The one or more sensors 135 may generally be configured to sense contact between the robotic arm 100 and another object. For example, in some embodiments, the one or more sensors 135 may sense contact between the robotic arm 100 and a target object, as described in greater detail herein. In particular embodiments, the one or more sensors 135 may be configured to sense an exact location of the contact between the robotic arm 100 and the target object. Such an exact location of contact may provide additional information with regards to the location of the target object, as described in greater detail herein. The one or more sensors 135 may generally be any sensor, particularly sensors configured to sense object contact. Thus, in some embodiments, the one or more sensors 135 may include one or more of a touch sensor, an infrared sensor, an optical sensor, a laser sensing device, and/or the like. A touch sensor may generally be a sensor that is configured to sense pressure caused by contact between the robotic arm 100 and a target object. An optical sensor may be an optical diode or the like that is configured to detect the object in its field of view when the object contacts the robotic arm 100. In some embodiments, the one or more sensors 135 may be a type of sensor that is commonly used, readily available, and does not require complex components and maintenance.

In various embodiments, the robotic arm 100 may also include a distal sensor 155 positioned at or near the distal portion 125 of the robotic arm. The distal sensor 155 may generally be configured to sense when the robotic hand 110 is positioned proximate to an object. For example, in some embodiments, the distal sensor 155 may be positioned such that it senses when the robotic hand 110 is sufficiently positioned to grasp a target object, as described in greater detail herein. In some embodiments, the distal sensor 155 may sense contact between the robotic hand 110 and a target object. The distal sensor 155 may generally be any sensor, particularly sensors configured to sense object proximity and/or object contact. Thus, in some embodiments, the distal sensor 155 may include a touch sensor, an infrared sensor, an optical sensor, a laser sensing device, and/or the like. In some embodiments, the distal sensor 155 may be a type of sensor that is commonly used, readily available, and does not require complex components and maintenance.

The robotic arm 100 depicted in FIG. 1 is merely illustrative. Accordingly, the robotic arm 100 may include any type of robotic arm and/or arm-like apparatus without departing from the scope of the present disclosure. Thus, those having ordinary skill in the art will recognize other robotic arms and arm-like apparatuses that function in a matter similar to the robotic arm 100 disclosed herein. Moreover, the present disclosure may also include robotic arms and/or arm like apparatuses containing additional or alternate components and functionality.

Figure 2:
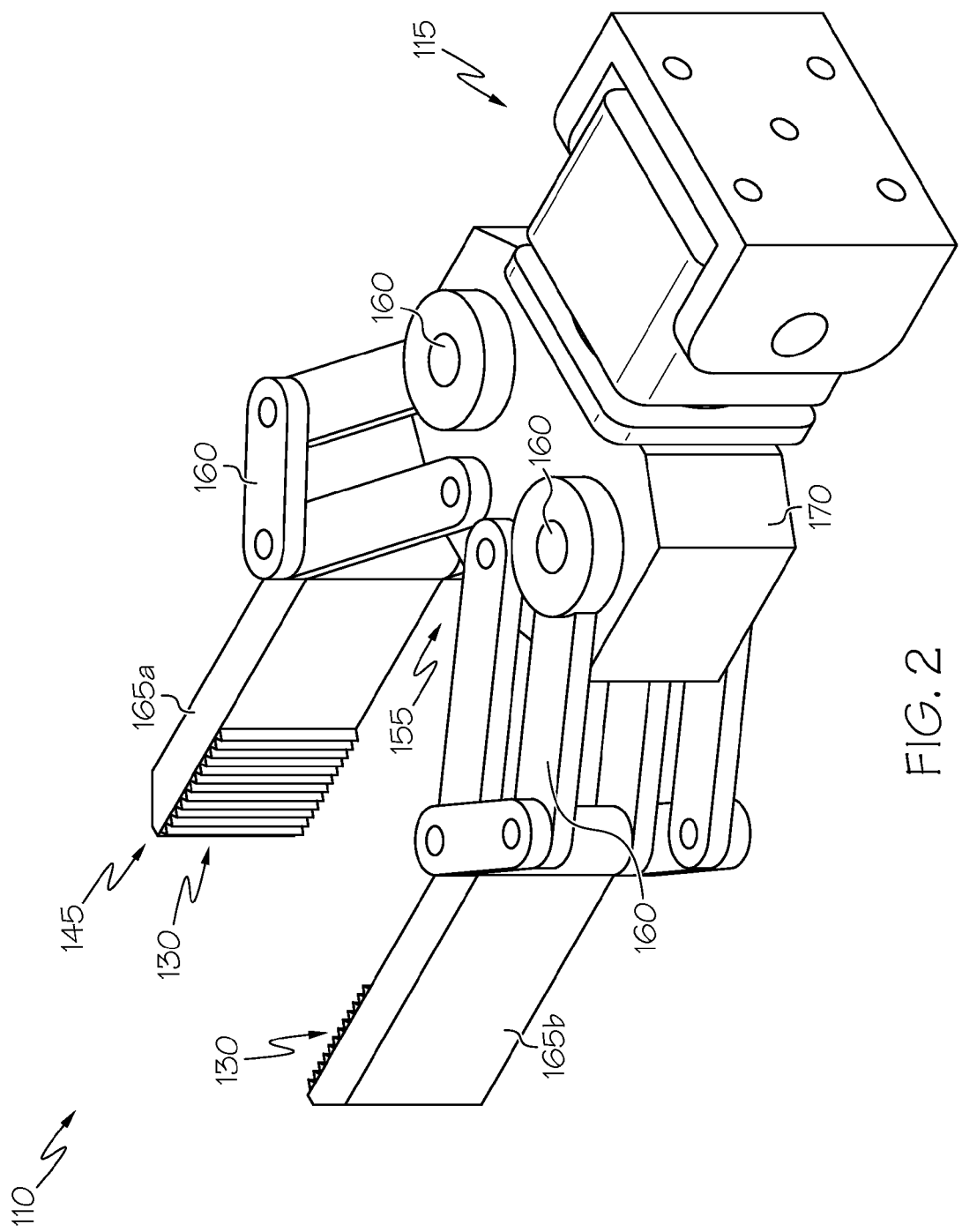
FIG. 2 depicts a schematic perspective view of an illustrative robotic hand according to one or more embodiments shown and described herein.
Figure 3:
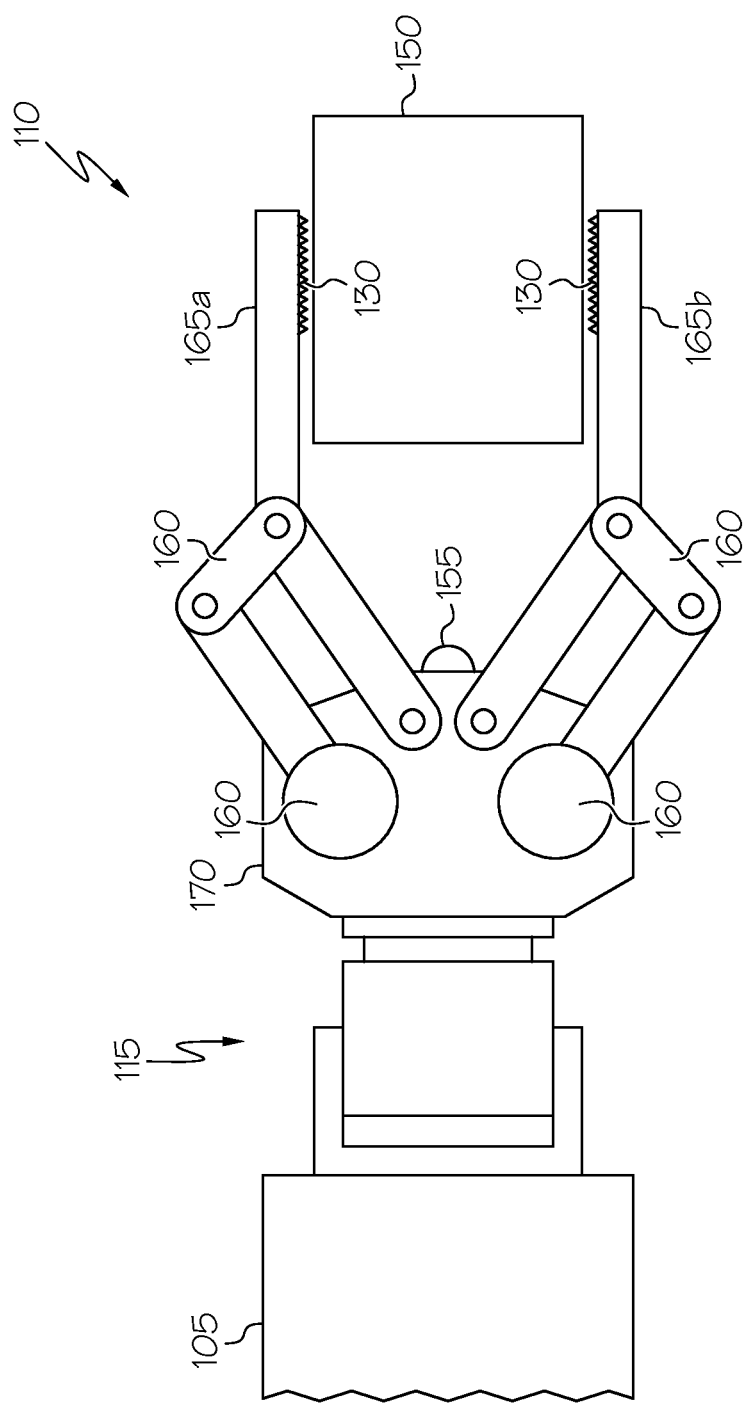
FIG. 3 depicts a schematic side view of an illustrative robotic hand gripping a target object according to one or more embodiments shown and described herein.

FIGS. 2 and 3 depict a perspective view and a side view, respectively, of an illustrative robotic hand 110 according to an embodiment. The robotic hand 110 may generally be connected to another portion of the robotic arm 100 (FIG. 1), such as an arm body segment 105, via one or more of the joints 115.

The robotic hand 110 may generally contain one or more components configured to control movement, grasping, and/or gripping functions of the robotic hand. For example, the robotic hand may include one or more of a motor, a solenoid, a hydraulic system, a pneumatic system, a piezoelectric system, and/or the like. In some embodiments, the robotic hand 110 may also include a plurality of fingers 165a, 165b (collectively, 165) that are configured to partially surround a target object 150, apply a gripping force on a target object, grasp a target object, release a target object, and/or the like. In some embodiments, the robotic hand 110 may include 2 fingers 165. In some embodiments, the robotic hand 110 may include 3, 4, 5, 6, 7, 8, or more fingers 165. The plurality of fingers 165 may function similar to fingers on a human hand. Thus, in some embodiments, a first finger 165a may be opposed to a second finger 165b such that at least one finger moves away from the other finger to open the robotic hand 110 and such that at least one finger moves towards the other finger to close the robotic hand. In some embodiments, both of the fingers 165a, 165b may move. In other embodiments, the first finger 165a may be stationary while only the second finger 165 moves. Those having ordinary skill in the art will recognize other combinations of stationary and moving fingers 165 that provide for an opening and closing of the robotic hand 110 to grasp or release the target object 150 without departing from the scope of the present disclosure.

In some embodiments, to move each finger 165, the robotic hand 110 may have one or more finger joints 160 and/or one or more finger control devices. The finger joints 160 may function similarly to the joints 115 of the robotic arm 100. Accordingly, the finger joints 160 may allow each finger 165 (or segment thereof) attached to the joint to move respective of a palm portion 170 of the robotic hand 110. In some embodiments, each finger 165 may be attached to the palm portion 170 of the robotic hand 110 via one or more joints 160. In other embodiments, each finger 165 may have a plurality of segments, where each segment is attached to each other via one or more joints 160 and to the palm portion 170 of the robotic hand 110 via one or more joints. The finger control devices (not shown) may be connected to the finger joints 160 and/or the fingers 165 and may move the fingers based on received control signals. Nonlimiting examples of finger control devices may include tendon-like connections, motors, solenoids, hydraulic systems, pneumatic systems, piezoelectric systems, and/or the like.

In some embodiments, a distal portion 145 of each finger 165 may include one or more friction pads 130, which are generally configured to provide additional grip for the robotic hand 110 when grasping the target object 150. Thus, the one or more friction pads 130 may provide frictional engagement of the robotic hand 110 with the target object 150. The friction pads 130 are not limited by this disclosure and may generally be any object that is capable of providing frictional engagement with objects. For example, in some embodiments, the friction pads 130 may be molded ridges or the like in each finger 165. In some embodiments, the friction pads 130 may be a material that is affixed to each finger 165, such as, for example, silicone, rubber, or the like.

Figure 4:
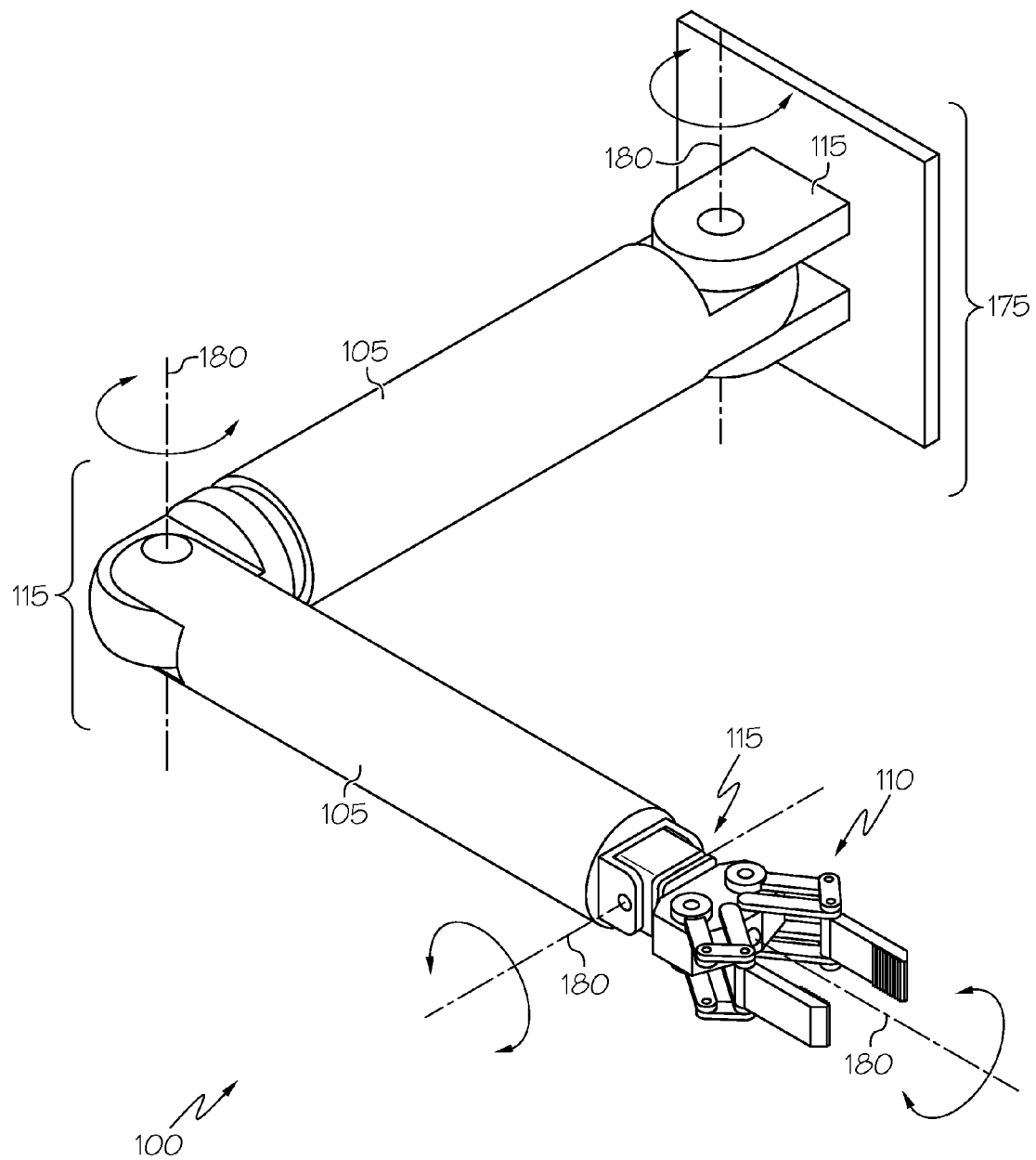
FIG. 4 depicts a schematic perspective view of an illustrative robotic arm and hand according to one or more embodiments shown and described herein.

FIG. 4 depicts a robotic arm 100 having two arm segments 105, a robotic hand 110, and a base plate 175. In some embodiments, the base plate 175 may be mounted on a fixed device, such as a base object, a wall, a floor, or the like. In other embodiments, the base plate 175 may be mounted on a movable object, such as a dolly, a body portion of a mobile robot, or the like. The arm segments 105, robotic hand 110, and base plate 175 may each be connected with a joint 115. Thus, the base plate 175 may be connected to an arm segment 105 via a joint 115, the two arm segments may be connected to each other via a joint, and the robotic hand 110 may be connected to an arm segment via a joint. As a result, the robotic arm 100 may have a degree of motion between the base plate 175 and an arm segment 105, a degree of motion between arm segments, and a degree of motion between an arm segment and the robotic hand 110. The various degrees of motion are depicted by the axes 180.

Figure 5A:
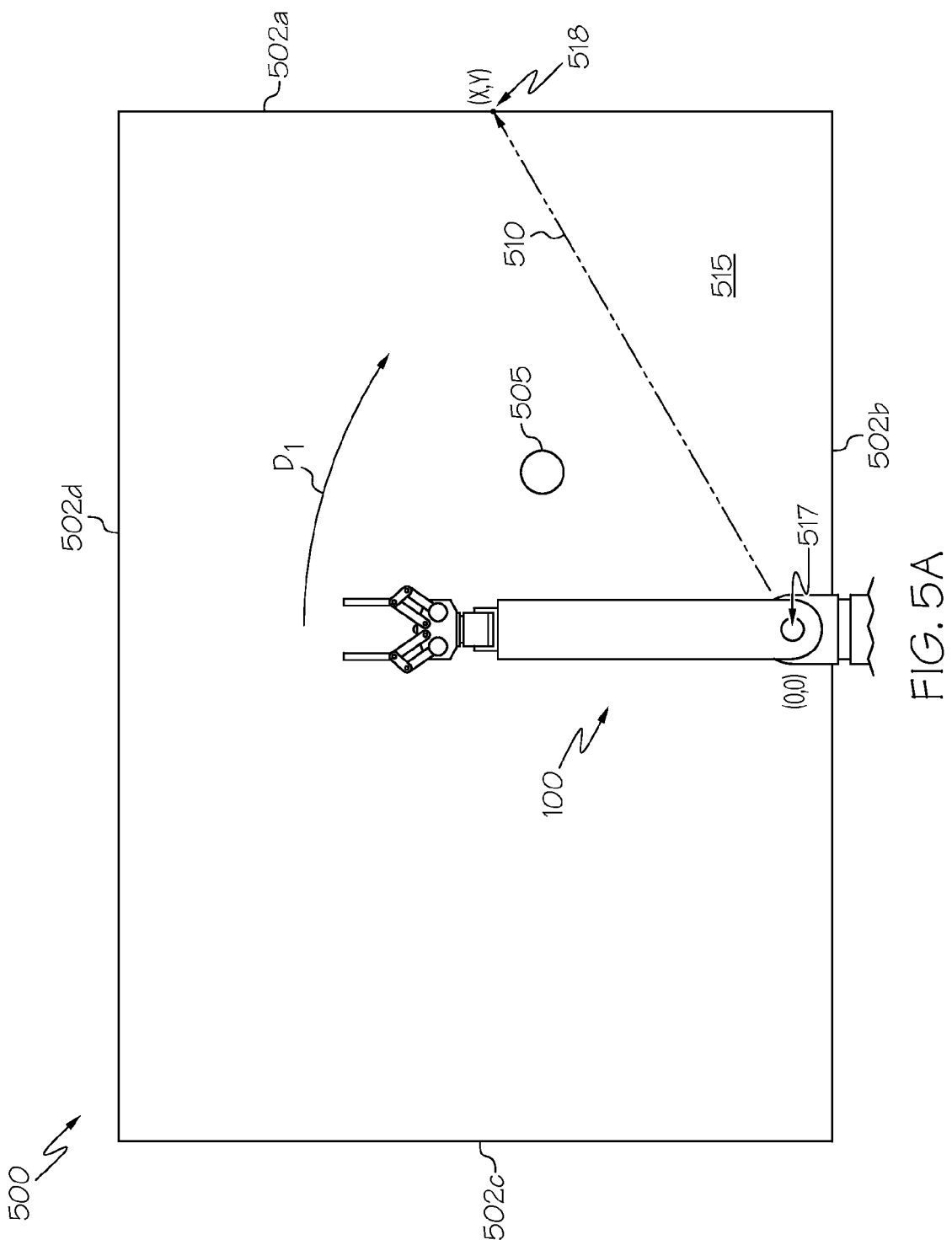
Figure 5B:
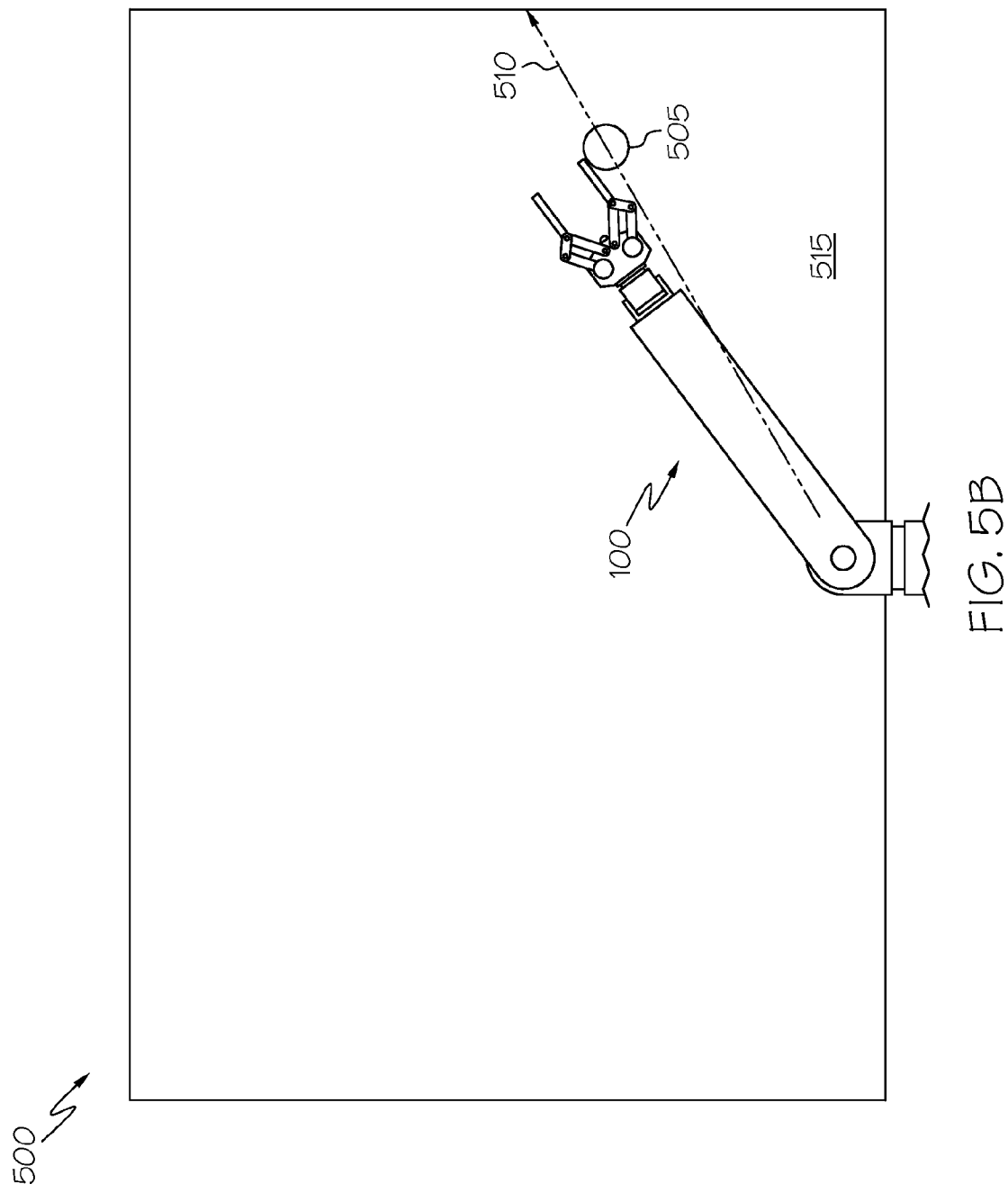

FIGS. 5A-5C depict movement of a single robotic arm 100 to locate and grasp a target object 505 according to an embodiment. In various embodiments, the robotic arm 100 may be placed upon a surface 500 containing the target object 505. The surface 500 may be a generally horizontal surface, such as a work surface or the like. The surface 500 may further be configured to support placement of one or more target objects 505 thereon such that the target objects do not fall off of the surface. Thus, in some embodiments, the surface 500 may be horizontal and one or more edges 502a-d (collectively, 502) of the surface may contain a lip, ridge, wall, or the like that prevents a target object 505 from falling off the edge of the surface. The dimensions of the surface 500 are not limited by this disclosure, but may generally be sized and shaped such that at least a portion of the robotic arm 100 can reach all portions of the surface, including each of the one or more edges 502.

In various embodiments, a system containing the robotic arm 100 may have at least a portion of the surface 500 mapped according to known dimensional coordinates. Accordingly, the system containing the robotic arm 100 may map a target area 515 of the surface 500 with known dimensional coordinates. In some embodiments, the mapped target area 515 may be an area that is smaller than the area of the surface 500 as a whole. In some embodiments, the mapped target area 515 may be an area that initially does not contain the one or more target objects 505. Such a mapped target area 515 may be bound, for example, by the robotic arm 100 when placed along a vector 510 and one or more edges 502 of the surface 500. Thus, as shown in FIGS. 5A-5C, the mapped target area 515 may be a triangular area bound by the vector 510, a first edge 502a, and a second edge 502b. In some embodiments, the mapped target area 515 is a vector space such as a Euclidean vector defined by the vector 510 as a line segment that extends from an initial point to a terminal point. Accordingly, the vector 510 may generally be defined as a line segment that extends from an immobile base portion 517 (coordinates 0,0) of the robotic arm 100 towards a known point 518 on the surface 500 (coordinates X,Y). The robotic arm 100 may be configured to move at a trajectory, such as, for example, by moving in a first direction $D_1$ until it reaches the vector 510 such that the mapped target area 515 is contained by the robotic arm and the two edges 502a, 502b.

The initial location of the target object 505 may be unknown to the system containing the robotic arm 100. Thus, the system may discover the location of the target object 505 by moving the robotic arm 100 in the first direction $D_1$ until the robotic arm reaches the vector 510. Movement of the robotic arm 100 may include sweeping the robotic arm to cause it to contact the target object 505 at its unknown location on the surface 500 and slide the target object towards the mapped target area 515. In some embodiments, the system may account for the size of the target object 505 to ensure that the robotic arm 100 stops at a location that places the target object along the vector 510. For example, the vector 510 may bisect the target object 505 when the robotic arm 100 stops. Once the target object 505 is placed along the vector 510, the system may recognize a general location of at least a portion of the target object within the mapped target area 515 that is sufficient to direct the robotic hand to grasp the target object. In some embodiments, the one or more sensors 135 (FIG. 1) may recognize such contact between the robotic arm 100 and the target object 505 and may signal the system that contact has been made. In some embodiments, the one or more sensors 135 may recognize an exact location of the contact between the robotic arm 100 and the target object 510.

Upon reaching the vector 510, the robotic arm 100 may be configured to stop such that the target object 505 lies on the vector. The robotic arm 100 may be configured to retract and move away from the target object 505, thereby leaving the target object along the vector 510. The robotic hand, if closed, may be configured to open. For example, the robotic hand may be configured to open sufficiently to ensure that the fingers of the robotic hand can move around the target object without bumping the target object from its location. The robotic arm 100 may be configured to extend in a second direction $D_2$ with an opened robotic hand until the target object 505 is between the fingers of the robotic hand. In some embodiments, direction $D_2$ may correspond to the vector 510. In some embodiments, the system may be configured to detect that the target object 505 is between the fingers of the robotic hand by receiving a signal from the distal sensor 155 (FIGS. 1-3) indicative of target object detection. In some embodiments, the fingers of the robotic hand may close around at least a portion of the target object 505 to grasp the target object. The robotic arm 100 may be configured to further manipulate the target object 505, such as to lift the target object, move the target object to another area, affix the target object to another object, and/or the like.

Figure 6A:
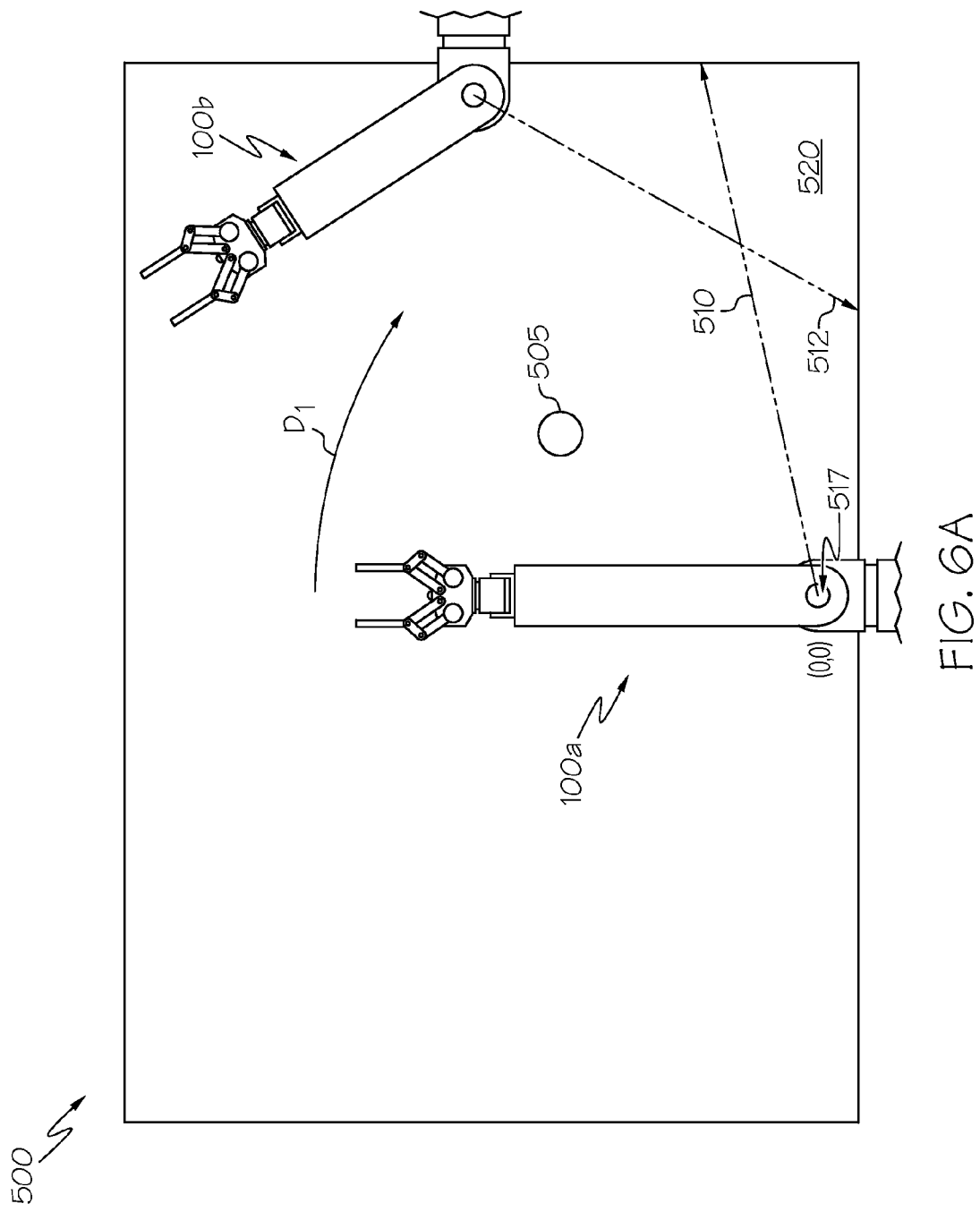
Figure 6C:
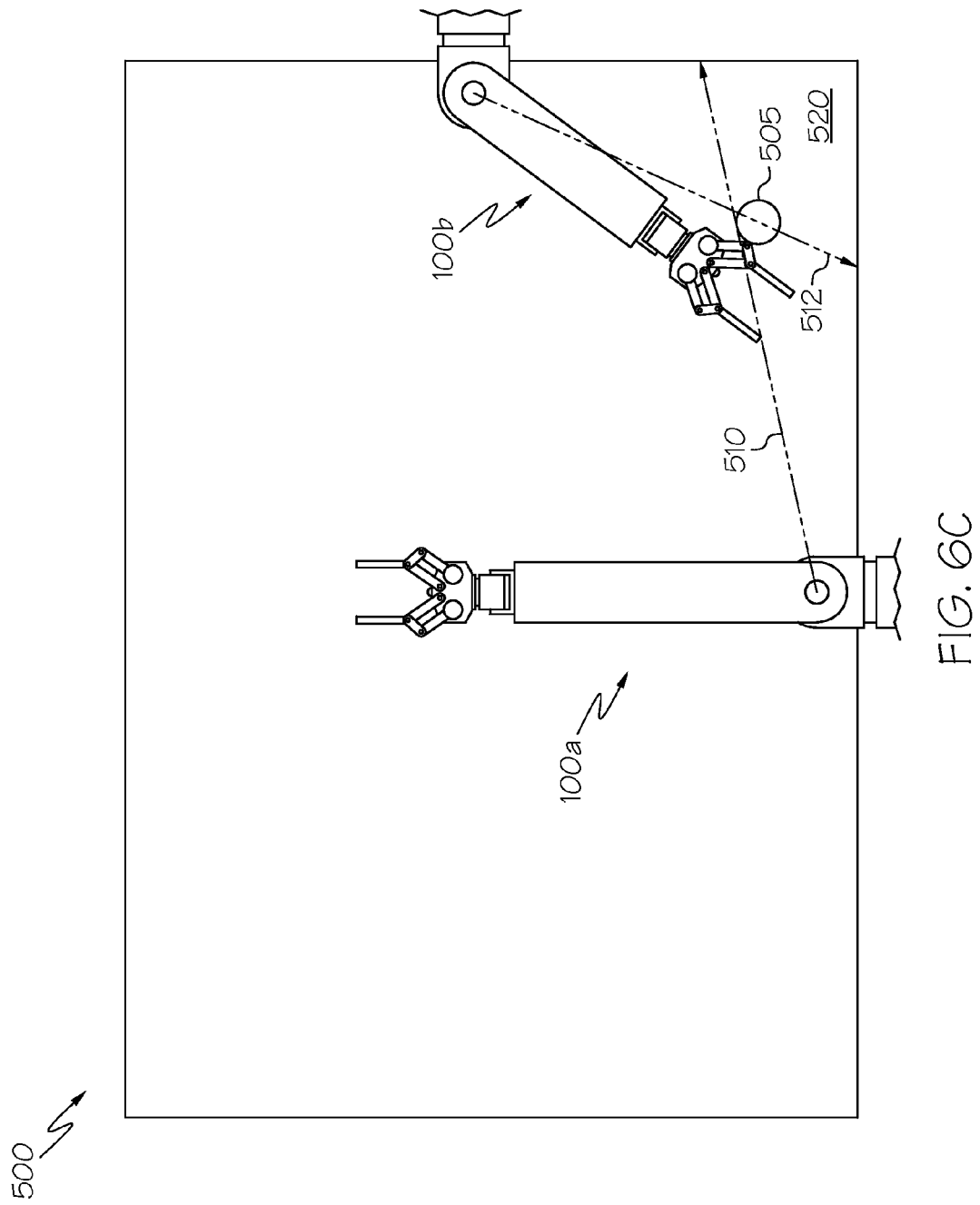

As shown in FIGS. 6A-6C, a plurality of robotic arms 100 may be used to move the target object 505. While FIGS. 6A-6C depict two robotic arms 100, those having ordinary skill in the art will recognize that more than two arms may be used without departing from the scope of the present disclosure. Each additional robotic arm that is used may decrease the size of a mapped target area, thereby increasing the accuracy of the positioning of the target object 505, as described in greater detail herein. When a plurality of robotic arms 100 are used, the arms may move in succession such that each arm pushes the target object 505 into successive mapped target areas. For example, a first robotic arm 100a may move in direction $D_1$ to push the target object 505 across the surface 500 similar to the movement described herein with respect to FIGS. 5A-5C. Once the target object 505 has been pushed by the first arm 100a to the first vector 510 defining a first mapped target area 515, the first arm may retract and move away such that a second robotic arm 100b may move in direction $D_3$ to push the target object to a second vector 512. The second vector 512, along with the first vector 510, the first edge 502a, and the second edge 502b, may define a second mapped target area 520 that is generally smaller in size than the first mapped target area 515. Because the second mapped target area 520 is smaller, it increases the accuracy of the robotic hand in gripping the target object 505. In some embodiments, particularly embodiments where a sensor on the first robotic arm 100a can sense an exact location of contact, the precise location of the target object 505 may be obtained by determining the paths that the target object travels while being pushed by each of the robotic arms 100a, 100b. Such a precise location may ensure a more accurate grip by the robotic hand.

Once the target object 505 has been pushed by the second robotic arm 100b to the second vector 512 defining the second mapped target area 520, the second robotic arm may retract and move away such that a robotic hand may extend and grasp the target object. In some embodiments, the robotic hand may be located on the first robotic arm 100a. In some embodiments, the robotic hand may be located on the second robotic arm 100b. The robotic arm 100 may be configured to extend with an opened robotic hand until the target object 505 is between the fingers of the robotic hand. In some embodiments, the system may be configured to detect that the target object 505 is between the fingers of the robotic hand by receiving a signal from the distal sensor 155 (FIGS. 1-3) indicative of target object detection. In some embodiments, the fingers of the robotic hand may close around at least a portion of the target object 505 to grasp the target object. The robotic arm 100 may be configured to further manipulate the target object 505, such as to lift the target object, move the target object to another area, affix the target object to another object, and/or the like.

Figure 7:
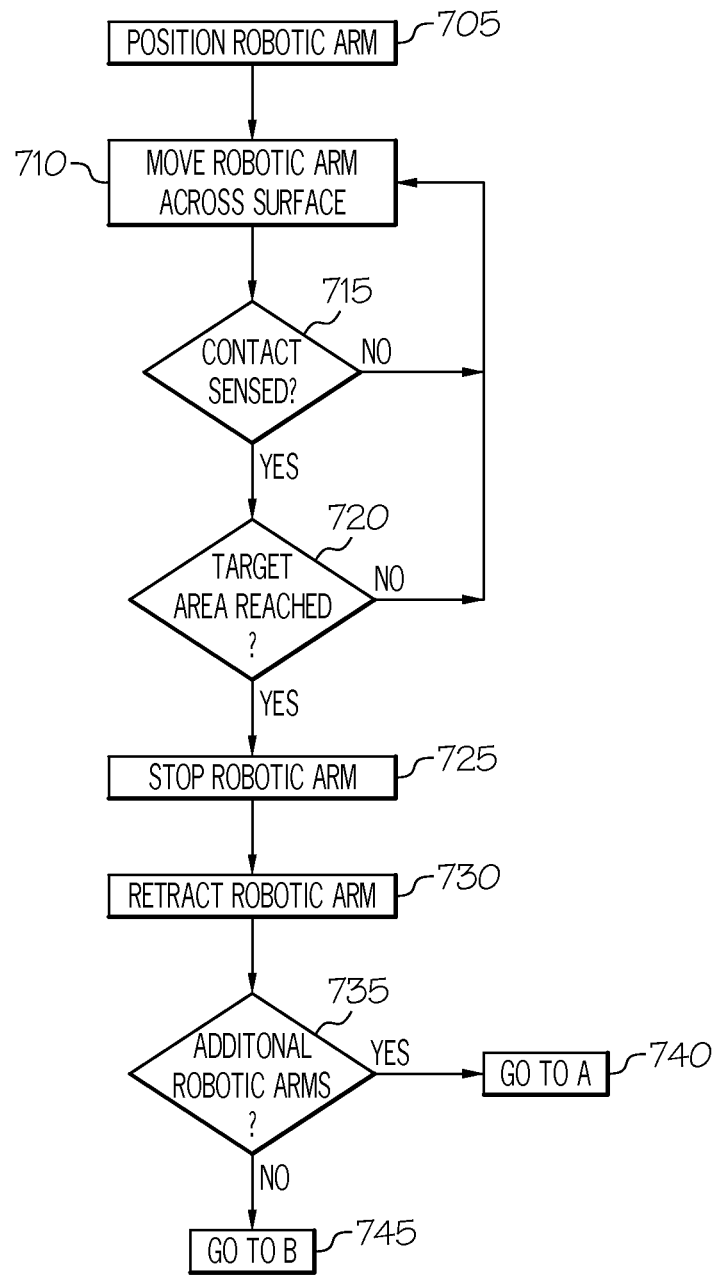
FIG. 7 depicts a flow diagram of an illustrative method of moving a target object to a target area with a robotic arm according to one or more embodiments shown and described herein.

FIG. 7 depicts a flow diagram of an illustrative method of moving a target object to a target area with a robotic arm according to an embodiment. Any portion of the method may be performed manually or as a series of processes completed by a processing device, as described in greater detail herein.

In various embodiments, the robotic arm may be positioned 705 at a location on a surface, such as a work surface or the like, as described in greater detail herein. The robotic arm may generally be positioned 705 such that it is located proximate to a target object that is resting on the surface. As previously described herein, the exact location of the target object may be unknown. However, in some embodiments, the target object may be known to not be located within a mapped target area bound by a vector and two edges of the surface, as described in greater detail herein.

The robotic arm may move 710 across the surface such that it sweeps across the surface and pushes an object (such as the target object) towards the target area, as described in greater detail herein. In some embodiments, the robotic arm may move 710 in a sweeping motion. In some embodiments, the robotic arm may move 710 responsive to one or more signals sent to the robotic arm (or portions thereof). For example, a processing device may transmit a MOVE signal and/or one or more directional coordinate signals (to direct a path of the move) to one or more portions of the robotic arm to cause the robotic arm to move 710 across the surface.

In various embodiments, a determination 715 may be made as to whether the robotic arm has made contact with the target object. In some embodiments, such a determination 715 may be achieved responsive to one or more signals received from one or more sensors mounted on the robotic arm. For example, the one or more sensors may transmit a "no contact" signal until contact has been achieved. In some embodiments, the one or more sensors may transmit a "contact" signal once contact has been achieved. If the determination 715 is that no contact has been sensed, the robotic arm may continue to move 710 toward the target area. If the determination 715 is that contact has been sensed, a determination 720 may be made as to whether the target area has been reached. In some embodiments, such a determination 720 may be achieved responsive to one or more signals received from one or more sensors mounted on the robotic arm. For example, the one or more sensors may transmit a location signal indicative of a location of the robotic arm. In some embodiments, such a determination 720 may occur when the coordinates of the robotic arm correspond to the coordinates of the vector and/or the mapped target area, as described in greater detail herein. If the determination 720 is that the robotic arm has not reached the target area, the robotic arm may continue to cause the second robotic arm to move 710 across the surface.

If the determination 720 is that the robotic arm has reached the target area, movement of the robotic arm may stop 725. In some embodiments, stopping 720 the robotic arm may be achieved by transmitting one or more signals to one or more portions of the robotic arm to stop movement. For example, a processing device may transmit a STOP signal to one or more portions of the robotic arm to cause the robotic arm to stop 725 movement.

In various embodiments, the robotic arm may retract 730. In some embodiments, retracting 730 the robotic arm may be completed responsive to one or more signals transmitted to one or more portions of the robotic arm. For example, a processing device may transmit a RETRACT signal to one or more portions of the robotic arm to cause the robotic arm to retract 730.

In various embodiments, a determination 735 may be made as to whether system has multiple robotic arms. If multiple robotic arms do exist, the process may continue 740 in FIG. 8. If the system only includes a single robotic arm, the process may skip to FIG. 9.

Figure 8:
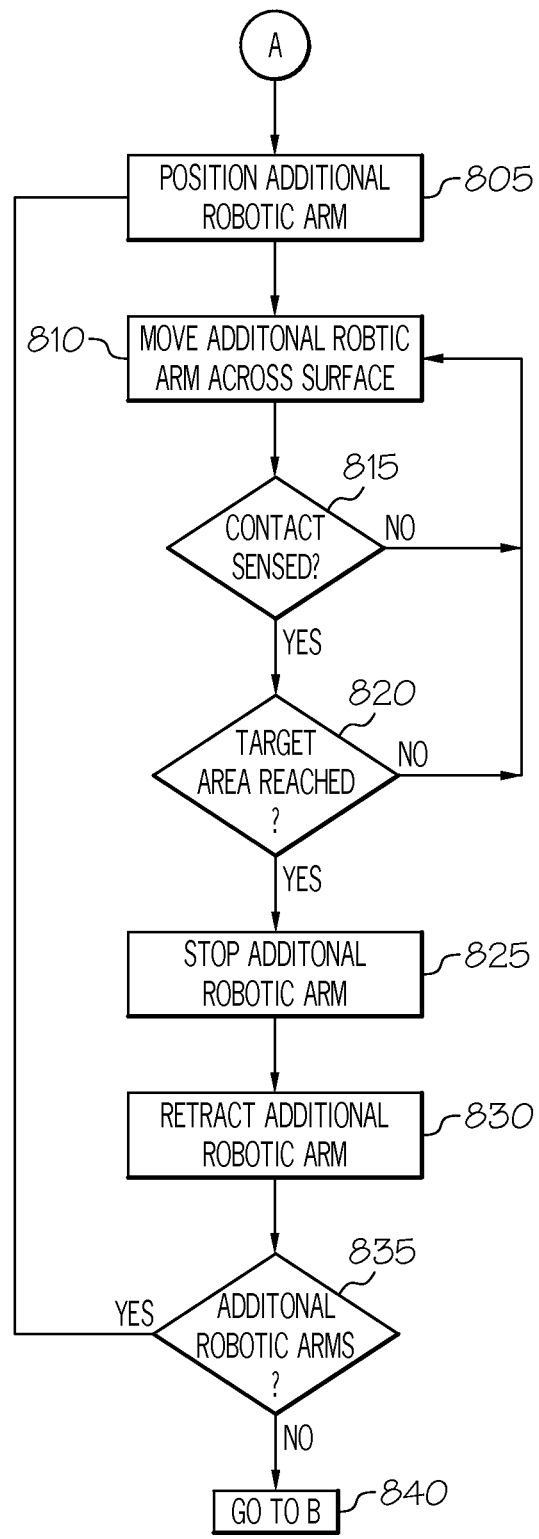
FIG. 8 depicts a flow diagram of an illustrative method of moving a target object to a second target area with a second robotic arm according to one or more embodiments shown and described herein.

As shown in FIG. 8, the process may include positioning 805 the second robotic arm. The second robotic arm may be positioned 805 at a location on a surface, such as a work surface or the like, as described in greater detail herein. The second robotic arm may generally be positioned 805 such that it is located proximate to the target object that is resting on the surface and has been pushed by the first robotic arm described herein with respect to FIG. 7.

The second robotic arm may move 810 across the surface such that it sweeps across the surface and pushes the object (such as the target object) towards a second target area, as described in greater detail herein. In some embodiments, the second robotic arm may move 810 responsive to one or more signals sent to the second robotic arm (or portions thereof). For example, a processing device may transmit a MOVE signal and/or one or more directional coordinate signals to one or more portions of the second robotic arm to move 810 across the surface.

In various embodiments, a determination 815 may be made as to whether the second robotic arm has made contact with the target object. In some embodiments, such a determination 815 may be achieved responsive to one or more signals received from one or more sensors mounted on the second robotic arm. For example, the one or more sensors may transmit a "no contact" signal until contact has been achieved. In some embodiments, the one or more sensors may transmit a "contact" signal once contact has been achieved. If the determination 815 is that no contact has been sensed, the second robotic arm may continue to move 810 toward the target area. If the determination 815 is that contact has been sensed, a determination 820 may be made as to whether the second target area has been reached. In some embodiments, such a determination 820 may be achieved responsive to one or more signals received from one or more sensors mounted on the second robotic arm. For example, the one or more sensors may transmit a location signal indicative of a location of the second robotic arm. In some embodiments, such a determination 820 may occur when the coordinates of the second robotic arm correspond to the coordinates of the second vector and/or the second mapped target area, as described in greater detail herein. If the determination 820 is that the second robotic arm has not reached the second target area, the second robotic arm may continue to move 810 across the surface.

If the determination 820 is that the second robotic arm has reached the second target area, movement of the second robotic arm may stop 825. In some embodiments, stopping 825 the robotic arm may be achieved by transmitting one or more signals to one or more portions of the second robotic arm to stop movement. For example, a processing device may transmit a STOP signal to one or more portions of the second robotic arm to cause the second robotic arm to stop 825 movement.

In various embodiments, the second robotic arm may retract 830. In some embodiments, retracting 830 the second robotic arm may be completed responsive to one or more signals transmitted to one or more portions of the second robotic arm. For example, a processing device may transmit a RETRACT signal to one or more portions of the second robotic arm to cause the second robotic arm to retract 830.

A determination 835 may be made as to whether additional robotic arms exist. If the system includes greater than two robotic arms, the processes described with respect to FIG. 8 may be repeated for each additional robotic arm. Once all of the robotic arms used to push the target objects have completed the pushing motions, the process may continue 840 in FIG. 9.

Figure 9:
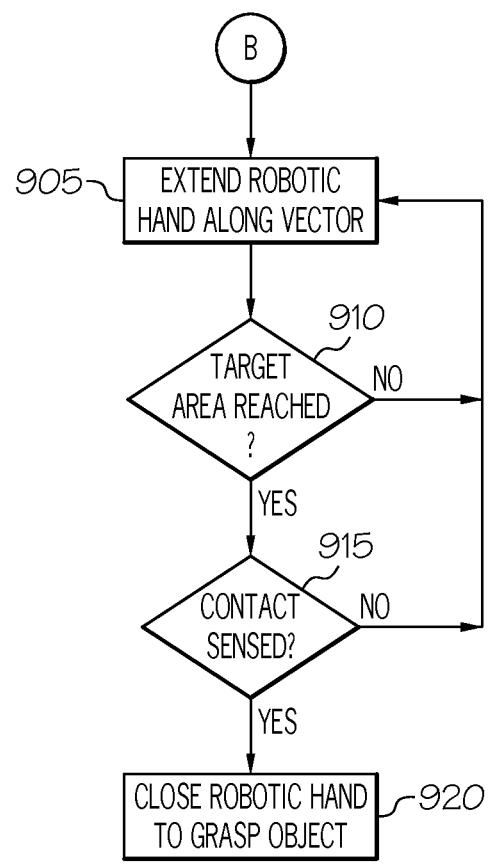
FIG. 9 depicts a flow diagram of an illustrative method of using a robotic hand to grasp a target object according to one or more embodiments shown and described herein.

As shown in FIG. 9, the process may include extending 905 an opened robotic hand along a vector that corresponds to the location of the target object, as described in greater detail herein. The opened robotic hand may be a portion of the first robotic arm or the second robotic arm. Extending 905 the opened robotic hand may be completed responsive to one or more signals transmitted to one or more portions of the robotic arm. For example, a processing device may transmit a EXTEND signal to one or more portions of the robotic arm to cause the robotic arm to extend 905.

In various embodiments, a determination 910 may be made as to whether the target area has been reached as the opened robotic hand extends along the vector. In some embodiments, such a determination 910 may be achieved responsive to one or more signals received from one or more sensors mounted on the robotic hand and/or the robotic arm. For example, the one or more sensors may transmit a location signal indicative of a location of the robotic hand. In some embodiments, such a determination 910 may occur when the coordinates of the robotic hand correspond to the coordinates of the vector and/or the mapped target area, as described in greater detail herein.

If the target area has not been reached, the system may continue to extend 905 the robotic hand. If the target area has been reached, a determination 915 may be made as to whether contact between the robotic hand and the target object has been reached. In some embodiments, such a determination 915 may be achieved responsive to one or more signals received from one or more sensors mounted on the robotic hand, such as, for example, the distal sensor 155 (FIGS. 1-3). For example, the one or more sensors may transmit a "no contact" signal until contact has been achieved. In some embodiments, the one or more sensors may transmit a "contact" signal once contact has been achieved.

If contact has not been achieved, the robotic arm may continue to extend 905 until contact has been achieved. If contact has been achieved, the robotic hand may close 920 to grasp the object. Closing 920 the robotic hand may be completed responsive to one or more signals transmitted to one or more portions of the robotic hand and/or the robotic arm. For example, a processing device may transmit a CLOSE signal to one or more portions of the robotic hand and/or the robotic arm to cause the robotic hand to close 920. The robotic hand may generally close 920 sufficiently so as to appropriately grip or grasp the target object, but without damaging the target object. Moreover, the robotic hand may generally close 920 sufficiently so as to allow the robotic hand to pick up the target object, manipulate the target object, attach the target object to another object, and/or the like.

Figure 10:
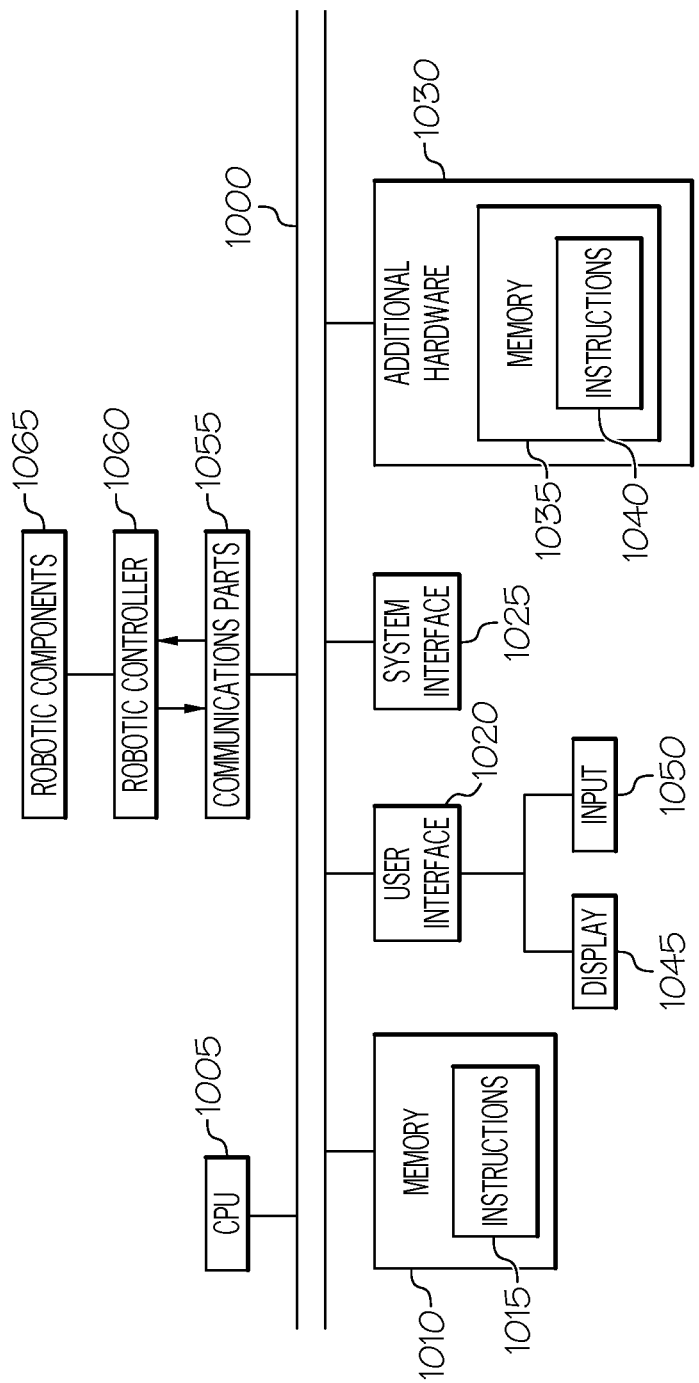
FIG. 10 depicts a block schematic diagram of illustrative computing device components according to one or more embodiments shown and described herein.

FIG. 10 depicts a block diagram of illustrative internal hardware that may be used to contain or implement program instructions, such as the process steps discussed herein, according to various embodiments. A bus 1000 may serve as the main information highway interconnecting the other illustrated components of the hardware. A CPU 1005 may be the central processing unit of the system, performing calculations and logic operations required to execute a program. The CPU 1005, alone or in conjunction with one or more of the other elements disclosed in FIG. 10, is an illustrative processing device, computing device or processor or combinations thereof, as such terms are used within this disclosure. Memory 1010 such as read only memory (ROM) and random access memory (RAM) may constitute illustrative memory devices (i.e., processor-readable non-transitory storage media). Such memory may include one or more program instructions 1015 thereon that, when executed by the CPU 1005, cause the CPU to complete various processes, such as the processes described herein. Optionally, the program instructions 1005 may be stored on a tangible computer-readable medium such as a compact disc, a digital disk, flash memory, a memory card, a USB drive, an optical disc storage medium, such as a Blu-ray™. disc, and/or other non-transitory processor-readable storage media.

An optional user interface 1020 may permit information from the bus 1000 to be displayed on a display 1045 in audio, visual, graphic, or alphanumeric format. Moreover, the user interface 1020 may also include one or more inputs 1050 that allow for transmission to and receipt of data from input devices such as a keyboard, a mouse, a joystick, a touch screen, a remote control, a pointing device, a video input device, an audio input device, a haptic feedback device, and/or the like.

A system interface 1025 may generally provide the system to interface with other external devices, such as, for example, one or more robotic controllers 1060, external computing devices, remote servers, and/or the like. Communication with external devices, such as the one or more robotic controllers 1060 (which control one or more robotic components 1065), may occur using various communication ports 1055. An illustrative communication port 1055 may be attached to a communications network, such as the Internet, an intranet, a local network, a direct connection, and/or the like. The various communication ports 1055 may generally be configured to transmit and/or receive one or more signals from the robotic components to complete various processes described in greater detail herein.

In various embodiments, the system may include additional hardware 1030. In some embodiments, the additional hardware 1030 may include its own memory 1035 storing programming instructions 1040. The additional hardware 1030 is not limited by this disclosure and may generally be any type of computer-related hardware. Illustrative additional hardware 1030 may include, for example, a connected storage device, a server, and an offsite remote storage device. Illustrative offsite remote storage devices may include hard disk drives, optical drives, tape drives, cloud storage drives, and/or the like.

The internal hardware of FIG. 10 and/or components thereof may be used to carry out the various processes as described herein, particularly the various processes described with respect to FIGS. 7-9.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of determining a location of a target object on a surface, the method comprising:
   positioning a robotic arm proximate to the target object;
   moving the robotic arm at a trajectory such that the robotic arm contacts the target object and pushes the target object across the surface into a target area bound by known dimensional coordinates;
   moving a robotic hand coupled to the robotic arm along a vector that corresponds to one of the known dimensional coordinates such that the robotic hand contacts the target object in the target area; and
   grasping the target object with the robotic hand.

2. The method of claim 1, further comprising, prior to moving the robotic hand:
   moving a second robotic arm such that the second robotic arm enters the target area and pushes the target object across the surface along a second vector into a second target area bound by known second dimensional coordinates, wherein the second target area is smaller in dimensions than the target area.

3. The method of claim 1, further comprising:
   sensing, by a sensor coupled to the robotic arm, contact between the robotic arm and the target object.

4. The method of claim 1, wherein the target area is a vector space.

5. The method of claim 1, wherein an exact location of the target object is unknown prior to positioning the robotic arm.

6. The method of claim 1, wherein moving the robotic arm comprises sweeping the robotic arm across the surface.

7. A system of determining a location of a target object on a surface, the system comprising:
- a robotic arm coupled to a robotic hand;
- a processing device in communication with the robotic arm; and
- a non-transitory, computer-readable storage medium in communication with the processing device, wherein the non-transitory, computer readable storage medium comprises programming instructions that, when executed, cause the processing device to:
  - direct the robotic arm to move from a first location that is proximate to the target object such that the robotic arm contacts the target object and pushes the target object across the surface into a target area in a second location, wherein the target area is bound by known dimensional coordinates,
  - direct the robotic hand to move along a vector that corresponds to one of the known dimensional coordinates such that the robotic hand contacts the target object in the target area, and
  - direct the robotic hand to grasp the target object.

8. The system of claim 7, further comprising:
- a second robotic arm,
- wherein the non-transitory, processor-readable storage medium further comprises one or more programming instructions that, when executed, cause the processing device to, prior to directing the robotic hand to move, direct the second robotic arm to move such that the second robotic arm enters the target area and pushes the target object across the surface along a second vector into a second target area bound by known second dimensional coordinates, wherein the second target area is smaller in dimensions than the target area.

9. The system of claim 7, further comprising:
- a sensor coupled to the robotic arm,
- wherein the non-transitory, processor readable storage medium further comprises one or more programming instructions that, when executed, cause the processing device to receive a signal from the sensor, wherein the signal is indicative of the sensor sensing contact between the robotic arm and the target object.

10. The system of claim 9, wherein the sensor is an optical sensor.

11. The system of claim 9, wherein the sensor is a touch sensor.

12. The system of claim 7, wherein the target area is a vector space.

13. The system of claim 7, wherein an exact location of the target object is unknown prior to positioning the robotic arm.

14. The system of claim 7, wherein the one or more programming instructions that, when executed, cause the processing device to direct the robotic arm to move comprises one or more programming instructions that, when executed, cause the processing device to direct the robotic arm to sweep across the surface.

15. A method of determining a location of a target object on a surface, the method comprising:
- directing, by a processing device, a robotic arm to move from a first location that is proximate to the target object such that the robotic arm pushes the target object across the surface into a target area in a second location, wherein the target area is bound by known dimensional coordinates,
- directing, by the processing device, a robotic hand coupled to the robotic arm to move along a vector that corresponds to one of the known dimensional coordinates such that the robotic hand contacts the target object in the target area, and
- directing, by the processing device, the robotic hand to grasp the target object.

16. The method of claim 15, further comprising, prior to directing the robotic hand to move:
- directing, by the processing device, a second robotic arm to move such that the second robotic arm enters the target area and pushes the target object across the surface along a second vector into a second target area bound by known second dimensional coordinates, wherein the second target area is smaller in dimensions than the target area.

17. The method of claim 15, further comprising:
- receiving, by the processing device, a signal from a sensor coupled to the robotic arm, wherein the signal is indicative of the sensor sensing contact between the robotic arm and the target object.

18. The method of claim 15, wherein the target area is a vector space.

19. The method of claim 15, wherein an exact location of the target object is unknown prior to positioning the robotic arm.

20. The method of claim 15, wherein directing the robotic arm to move comprises directing, by the processing device, the robotic arm to sweep across the surface.

* * * * *